Aug. 28, 1951  C. J. GREINER ET AL  2,566,190
METHOD AND APPARATUS FOR MAKING TAMPONS
Filed Oct. 26, 1945  3 Sheets-Sheet 1
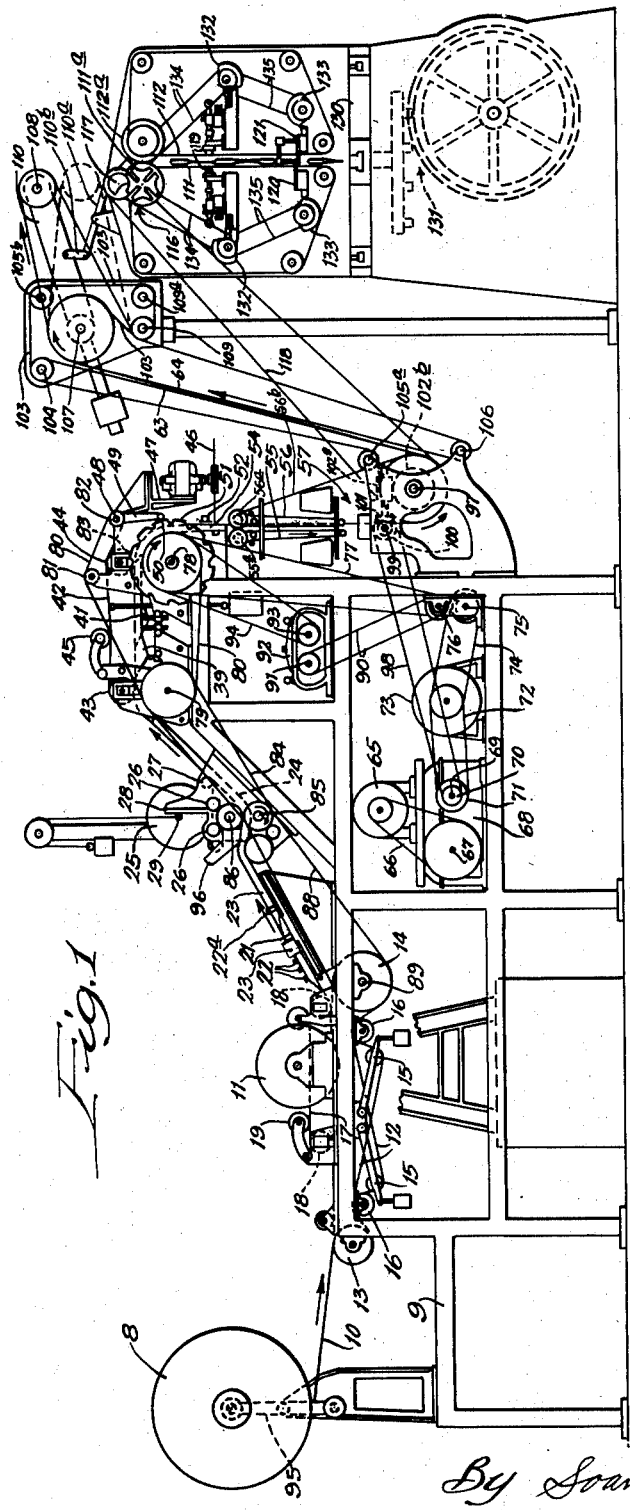
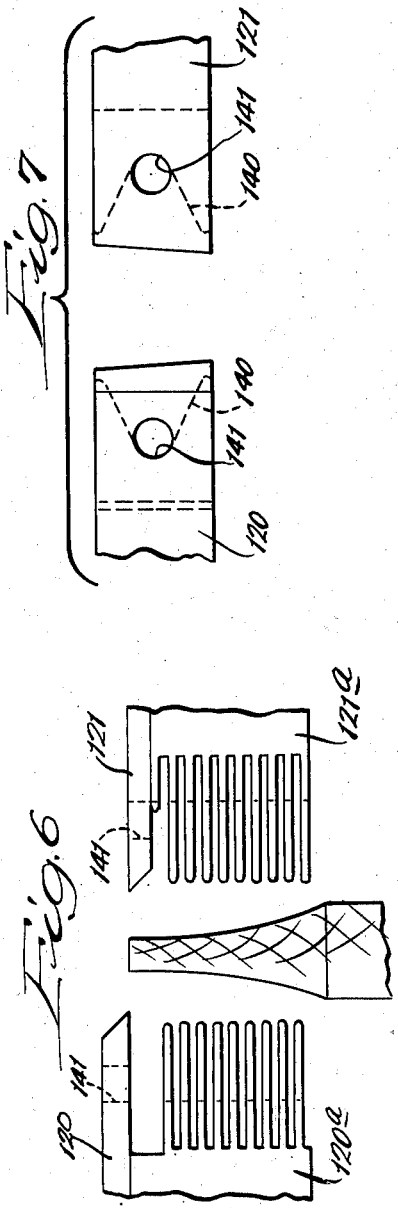
Inventors:
Charles J. Greiner and
Oscar T. Thompson
By Soans, Pond & Anderson
Attorneys.

Aug. 28, 1951  C. J. GREINER ET AL  2,566,190
METHOD AND APPARATUS FOR MAKING TAMPONS
Filed Oct. 26, 1945  3 Sheets-Sheet 2
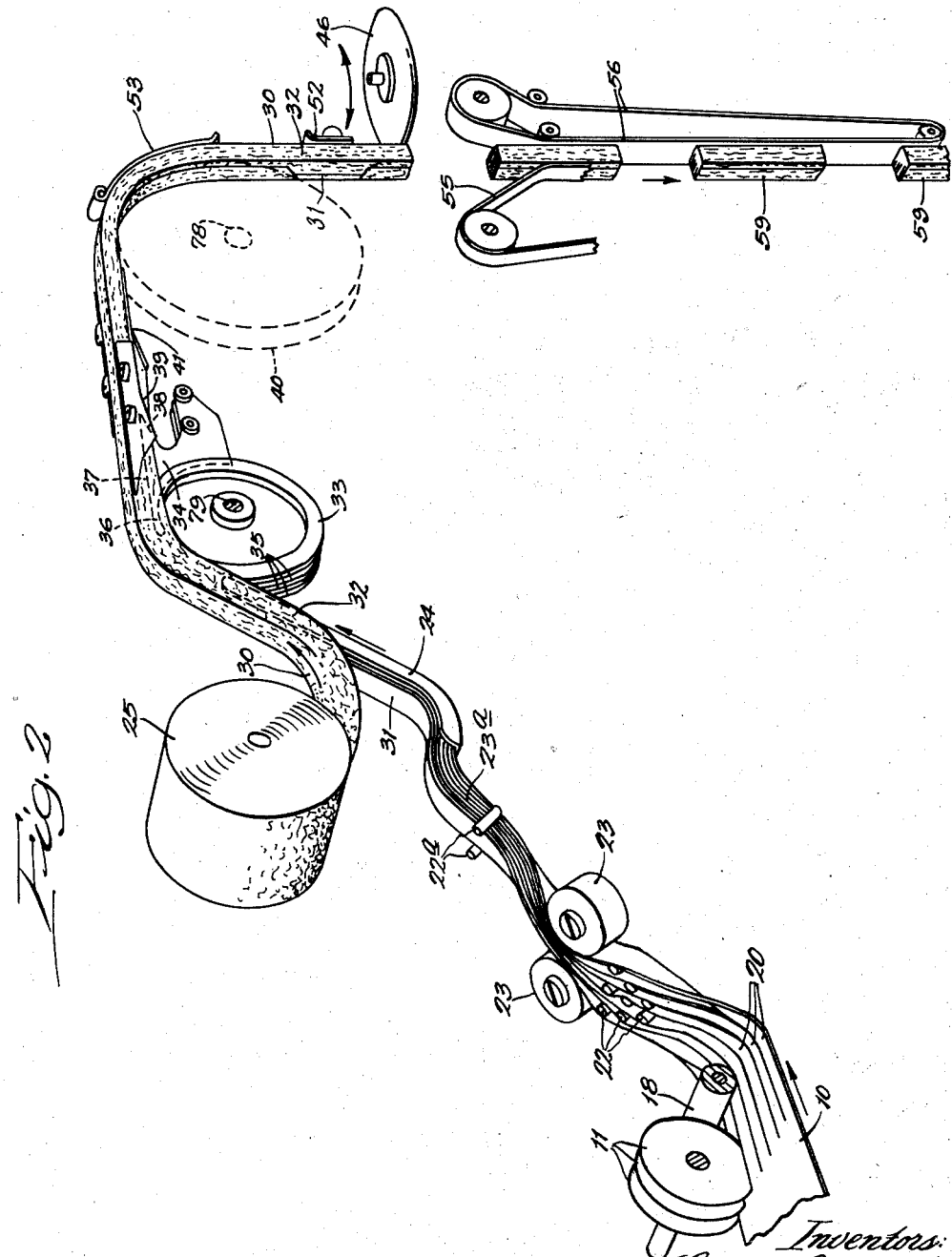

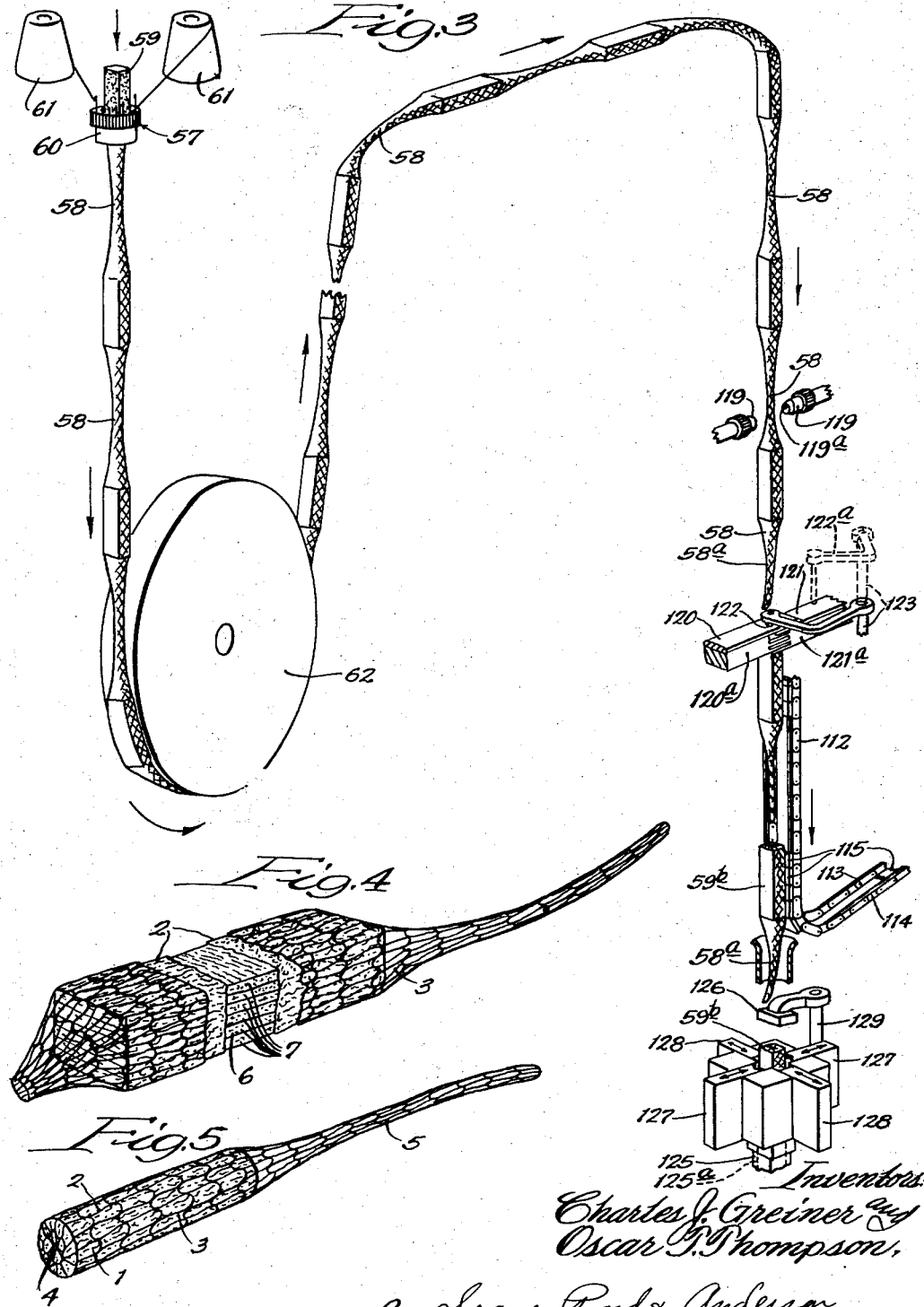

Patented Aug. 28, 1951

2,566,190

UNITED STATES PATENT OFFICE 2,566,190

METHOD AND APPARATUS FOR MAKING TAMPONS

Charles J. Greiner, Menasha, and Oscar T. Thompson, Neenah, Wis., assignors to International Cellucotton Products Company, a corporation of Delaware Application October 26, 1945, Serial No. 624,830

22 Claims. (Cl. 19—144)

This invention relates to a tampon of the catamenial type and to a method and apparatus for producing such a tampon.

The principal objects of the invention are to provide a tampon of the character indicated which will be of small initial size so as to be easily insertable into the vaginal cavity and which, notwithstanding its initially small size, will have a high capacity for fluid absorption; to provide a tampon which, upon being wetted when inserted into the vaginal cavity, will quickly expand so as to substantially fill the cavity to prevent leakage of menstrual fluids along the walls of the cavity and past the tampon; to provide an expanding tampon which will be readily removable notwithstanding its expanded condition after normal use; to provide a tampon which in its dry state is of small size transversely of its length and which is stable so as to retain its small size under normal conditions of storage and transportation during its movement from the producer to the user; and to provide a tampon having the characteristics indicated which may be made economically and at low cost.

Other objects of the invention are to provide an apparatus for rapidly and automatically producing tampons of the character indicated; to provide apparatus for producing the tampons without manual handling of the material which enters into the construction thereof, thereby to facilitate the producing of a hygienically clean product; to provide apparatus which operates in a continuous manner to produce the finished product from supplies of the required materials which are delivered to the apparatus; and to provide apparatus of the character indicated which is of relatively simple construction, and easy to maintain and operate.

A further object of the invention is to provide a simple but effective method for producing tampons of the character indicated from supplies of the materials entering into the tampon structure.

Other objects and advantages of the invention will be understood by reference to the following specification and accompanying drawings (3 sheets) wherein there is illustrated the improved tampon and a selected embodiment of the method and apparatus for producing the same.

In the drawings:

Fig. 1 is a more or less schematic side elevation of a selected embodiment of apparatus for producing the improved tampon;

Fig. 2 is a more or less diagrammatic perspective illustration of the method of operation of a portion of the apparatus shown in Fig. 1;

Fig. 3 is a more or less diagrammatic perspective illustration of the operations effected by the apparatus shown in Fig. 1 subsequent to those represented in Fig. 2;

Fig. 4 is a perspective illustrating an initial assembly of the elements of the improved tampon;

Fig. 5 is a perspective illustrating the completed tampon;

Fig. 6 is a side elevation of a portion of the mechanism shown also in Figs. 1 and 3; and Fig. 7 is a plan view of the mechanism shown in Fig. 6.

The completed tampon shown in Fig. 5 comprises an absorbent core 1 which is formed of suitable absorbent material, for example, a plurality of plies of creped tissue paper compressed into the more or less cylindrical form indicated. The compressed creped tissue paper core 1 has a surface covering 2 of cotton fibers to produce a smooth soft surface and the cotton covered core is enclosed in a knitted material tubular jacket 3 which has its front end portion 4 tucked into the front end of the absorbent core 1 and its rear portion 5 extended substantially beyond the rear end of the absorbent core to constitute a draw string.

The absorbent core 1 is, in this instance, formed from a more or less rectangular block of creped tissue sheets which is represented at 6 in Fig. 4. The block of creped tissue sheets may be formed by superposing upon each other, a series of multiple ply strips 7 of creped tissue paper. For example, in this instance, the block 6 is shown as being formed of six multiple ply layers or webs, and each layer or web may consist of the desired number of plies of creped tissue paper; for example, ten plies. The creping preferably runs cross-wise of the length of the plies as indicated in Fig. 4.

The soft, rectangular block of creped tissue paper is wrapped in a film of very loosely matted cotton fibers, such film being carried by a thin tissue paper ply, the tissue paper ply and cotton film being usually referred to as tissue or wadding backed cotton. The tissue backed cotton represented at 2 is wrapped transversely around the rectangular block of creped tissue paper, margins of the tissue backed cotton being overlapped on one of the wide faces of the block. Thereafter the cotton-covered block is fed endwise through a suitable knitting machine which knits the tubular sleeve or jacket 3 around the block. The jacket 3 is applied in such a manner by the knitting machine that the block of tissue paper is not compressed but remains substantially in its normal, soft, incompressed condition as represented in Fig. 4.

The jacket enclosed block as shown in Fig. 4, is next subjected to both longitudinal and transverse compression. The extent of such compression may vary considerably. In the present example the length of the tissue paper block is reduced to about 66 per cent of its initial length but it may be substantially greater. The transverse cross-section is herein shown as being reduced by compression to about 20 or 25 percent of its initial size. The lengthwise compression may be increased and the transverse compression decreased or vice versa and such changes may be effected in this respect so that either the length or the cross sectional area of the block or assemblage of tissue paper need not be changed while the other is changed.

In the illustrated embodiment of the tampon, the rectangular block of creped tissue paper may initially measure about 1¼ inches across the width of the block, ¾ of an inch across the thickness (preferably across the edges of the paper plies), and about 2¾ to 3 inches in length. The finished absorbent core in the tampon shown in Fig. 5 which is formed by compressing the absorbent body shown in Fig. 4 may measure approximately ½ inch in diameter by about 2 to 2⅛ inches in length. It is not essential that the absorbent body be compressed to an accurate cylindrical form but it may be of somewhat oval or flattened cross section. The stated dimensions are not critical or essential and are given merely as an example of a practical construction.

When the product is compressed to the extent indicated, the fibers of the creped tissue paper core are so consolidated that they tend to maintain themselves in that condition so that the finished tampon as represented in Fig. 5 is stable and remains in that condition until it becomes moistened or wetted as when put in use, whereupon it readily expands particularly in the transverse direction to effectively fill the vaginal cavity.

In the described tampon construction stability of the tampon in its compressed condition is due to the compression of the fibers of the core and their incidental consolidation and not to any surface constriction by the tissue backed cotton wrapper or the knitted jacket. Both the tissue backed wrapper and the knitted jacket are, of course, compressed or more or less gathered on the surface of the tampon incident to the compression thereof and they probably supply but little if any compression retaining effect. Any adherence of the tissue backed wrapper or of the knitted jacket to the compressed core, or between the folds of the wrapper and jacket between themselves and between each other, is probably no more than is required to maintain the jacket and wrapper in close fitting or hugging relation to the compressed absorbent body. The threads of which the jacket is made, being of small diameter and hard as compared with said core and said cotton wrapper, are well embedded in said wrapper and core as a result of said compression of the jacketed body, whereby said threads are, in effect, shielded by the softer core and wrapper material. Hence, surface smoothness and softness are attained.

Tampons of the character described may be manufactured by apparatus and by the method illustrated in Figs. 1, 2 and 3. As there shown, a supply roll 8 of creped tissue wadding is suitably supported on a frame structure 9. The web 10 of creped tissue wadding which is drawn from the supply roll 8 may consist of the desired number of plies, say ten plies, corresponding to the number of plies in each of the layers 7 in the tampon body. The web 10 is preferably of such width that it may be slitted longitudinally to provide a number of strips corresponding to the number of layers 7 in the tampon body which, in this instance, is six.

The web 10 is passed under a series of suitably spaced circular slitting knives 11 which may be motor driven so as to slit the web 10 into narrow strips of the proper width for producing the tampon body. The web 10 is supported in its passage under and between the slitters 11 by means of a series of narrow belts 12, the upper reaches of which travel between adjacent slitters 11 so as to avoid being cut thereby. The belts 12 are trained around supporting pulleys 13 and 14 suitably journaled on the frame-work 9, and to maintain said upper reaches taut, the lower reaches of belts are offset and passed around weighted rollers 15 and fixed guide rollers 16. To facilitate mounting of the required number of weighted rollers 15, one for each belt, the rollers are mounted on pivoted arms which extend alternately in opposite directions so that alternate belts are offset under a series of weighted rollers 15 near the roller 14 and the other alternate belts are offset around a weighted roller 15 near the main roller 13.

Similar narrow belts 17 are trained around guide rollers 18—18 which are so mounted that the lower reaches of the belts 17 engage the top surface of the web 10 between the slitters 11 and thereby act to hold the web down against the narrow belts 12. Weighted tension rollers 19 may be provided for acting on the upper reaches of the belts 17 to maintain the lower reaches thereof taut.

The web 10 issuing from between the belts 12 and 17 is thus slitted into a series of narrow ribbons 20. These ribbons are next turned on edge and guided into face to face relation to form a multiple layer strip or rope of creped tissue corresponding in cross section to the absorbent body of the tampon before it is compressed. This is accomplished by guiding the strips over an upwardly inclined table or plate 21 which is equipped with a series of upstanding pins 22 arranged in such proximity with each other that the respective strips, when passed between adjacent pins will necessarily be turned into a vertical position as best shown in Fig. 2. The strips 20 are thereby brought into a slightly spaced face to face relationship from which they are guided into face to face contact between a pair of axially vertical rolls 23 which are preferably driven. The assembled strips are then twisted back to horizontal positions one on top of the other as shown at 23a. A pair of upstanding guide pins 22a or rollers which may be driven, may be employed for guiding the superposed strips when restored to their horizontal positions one on top of the other.

From between the guide pins 22a, the multiple layer strip or rope of creped tissue paper is directed into a guide chute 24 which may be made of sheet metal and arranged to direct the rope of tissue in a generally upwardly inclined direction.

A supply roll 25 of tissue backed cotton is suitably supported on a pair of rollers 26 and the tissue backed cotton web is drawn from said supply roll and threaded under a guide roll 27 which is disposed adjacent the top surface of the rope 31 of tissue paper fibrous material traveling upwardly in the guide 24. The supply roll 25 is held against lateral shifting in the direction in which the web is drawn therefrom by means of upwardly extending frame elements 28 which are engaged by endwise extensions of the core shaft 29 of the supply roll. The weight of the supply roll 25 may advantageously be partially counterbalanced as indicated in Fig. 1, especially while the roll is large and heavy.

The tissue backed cotton web 30 is of such width that it may be wrapped completely around the multiple ply rope 31 with margins of the tissue backed cotton web overlapping on one side of the rope. As shown in Fig. 2, the tissue backed cotton web 30 is delivered over the top surface of the upwardly moving creped tissue rope, side or marginal portions of the web 30 draping themselves downwardly over the sides of the chute 24. The downwardly extending marginal side portions 32 of the web 30 are of considerably greater width than the corresponding dimension of the creped tissue rope 31 so that lower marginal portions of said sides 32 may be folded inwardly under the rope 31 and into mutually overlapping relation on the bottom side of said rope 31. Such folding is accomplished by passing the rope 31 and web 30 over a narrow guide wheel 33 and through suitable folding devices. Suitably mounted supports or guides 34, strip and guide the fibrous member 31 from said wheel 33.

The guide wheel 33 is peripherally grooved as indicated at 35 and said guides 34 have finger-like portions 36 which fit into grooves 35 so as to effectively strip the tissue rope 31 from the surface of the guide wheel 33 and the tissue member 31 travels over the edges 37 of said guide members 34.

There is provided a plow-like folding member 39 which operates to fold the depending margin of the side portions 32 of the web inwardly under the tissue rope 31 as it travels towards another guide wheel 40. The guide wheels 33 and 40 are preferably rubber faced or otherwise treated to reduce slippage. To facilitate this side folding operation, the guides 34 have rear end extensions 38 reduced in width to avoid interference with the underfolded side portion. The opposite side of the web 30 is similarly folded under the tissue rope and under the first folded side of the web by means of another folder 41 which operates on the other side portion of the tissue backed web 30 immediately after the folder 39 folds the first side of the web under the tissue rope.

To effect continued feeding of the web 30 and tissue rope 31 through the zone of operation of the folding devices 39 and 41 and to support the tissue member 31 against upward displacement by the forces produced by the folders, a belt 42 may be arranged to have its lower reach travel in a suitable plane to accomplish the indicated purpose. As shown in Fig. 1, the belt 42 may be trained around pulleys 43 and 44 which may be vertically slidably mounted in suitable frame supported bearings. Springs located under the bearings at the ends of the pulleys 43 and 44 serve to prevent the weight of the conveyor structure from being applied to the underlying wrapped rope, and set screws threaded through frame portions overlying the bearings are provided for lowering the belt to the proper plane against the pressure of the springs. A weighted roll 45 is provided in association with the upper reach of the belt 42 for maintaining the lower reach thereof taut.

The cotton wrapped multiple ply tissue rope 31 is guided around the roller 40 and is then directed in a downwardly extending path of travel as best shown in Fig. 2. Shortly below the guide roll 40, the cotton wrapped rope is severed transversely to divide it into sections of the desired length, such sections constituting the cotton wrapped incompressed tampon bodies such as shown in Fig. 4 of the drawings.

Severing of the cotton wrapped rope is effected by means of a motor driven circular saw or slitter 46 which is rocked laterally in such timed relation to the travel of the cotton wrapped rope as to cut the latter into units of predetermined substantially uniform length. For this purpose the motor driven saw 46 is supported on a bracket 47 which is pivoted as indicated at 48 on a stationary frame element. The bracket 47 and the motor driven saw carried thereby are rocked by means of an arm 49 which is secured to one end of the pivot shaft 48 and provided at its free end with a roller 50 which engages the periphery of a notched disk or cam wheel 51.

It will be seen that when the cam wheel 51 is rotated, the roller 50 at the free end of the arm 49 will drop into the successive peripheral notches of the wheel to thereby permit the saw to move across the path of travel of the cotton wrapped tissue rope to sever the same. The saw is, of course, returned to its inoperative position as shown in Fig. 1 when the free end of the arm 49 is forced outwardly by engagement of the roller 50 with the successive outer peripheral portions of the cam wheel 51. The saw 46 may be so arranged that it will rock in cutting direction by gravity, or spring means may be provided if desired to effect such movement of the saw.

During the time that the saw is moving across the cotton wrapped tissue rope, the normal continuous travel of the rope will be interrupted by a gripping member 52, which may be moved into engagement with the wrapped member so as to hold the latter in fixed position just before the saw 46 engages the wrapped member. The gripper 52 presses the rope against a cooperating backing 54 (Fig. 1) just above the zone of operation of the saw 46. The mechanism for so moving the member 52 may be of any suitable form; for example, it may include means (not shown) carried by the rocking bracket 47 for urging the member 52 into engagement with the wrapped member immediately before the saw engages the wrapped member and spring means (not shown) may repel the gripper when the bracket 47 moves outwardly.

To permit continued feed movement of the cotton wrapped rope while the advance portion of the rope is held against movement as aforesaid, a pivotally mounted weighted arm or guide member 53 is provided opposite a portion of the guide wheel 40. While the advance portion of the rope is being cut, the weighted guide member 53 is permitted to rock outwardly incident to the force of the wrapped material fed thereunder. The wrapped material thus leaves the periphery of the wheel 40 and forms a temporary, offset loop adjacent a portion of the periphery of the wheel 40. The weighted guide member 53 quickly restores the looped portion into engagement with the periphery of the wheel as soon as the member 52 frees the wrapped member for further movement. Side guides, not shown, are also advantageously provided for preventing sidewise displacement of the rope during the cutting operation.

The cut off portions of the wrapped member are delivered by gravity between a pair of cooperating belts 55 and 56 which have their upper ends so arranged as to receive the cut off unit when it drops from the rope upon being severed therefrom. Suitable guides (not shown) are, of course, provided to prevent the descending cut-off unit from tipping or twisting.

As shown, the upper or receiving end portions of the belts 55 and 56 are arranged with a V-shaped entrance which serves to provide an open mouth into which the cut-off units drop and by which the units are more or less wedged into place between the adjacent parallel reaches of the belts. The cut-off units may drop a short distance into the bight of said belts and they will be immediately gripped by said belts because of the compressing effect of the conveying belt portions.

The spacing of the units between the belts is determined by the speed relationship between the tissue rope as it approaches the cut-off saw and the belts, both of which may be made adjustable.

The belts 55 and 56 have their lower or discharge ends arranged in such relation to knitting mechanism indicated at 57 (Figs. 1 and 3) that the units successively discharged from the belts are delivered into the bight of the threads which are being knitted into a tubular sleeve 58. As shown in Fig. 3, one of the wrapped units 59 has its lower end emerging from the collar 60 of the knitting machine wherein the threads drawn from the supply spools 61 thereof are knitted into the tubular sleeve 58. The belts 55 and 56 are driven so as to advance the cut-off units into the knitted sleeve 68 at a speed of travel which is the same as the speed of travel of the knitted sleeve; thus there is no change of speed of the cut-off units as they are transferred from the belts to the knitted sleeve.

As shown in Fig. 3, the sleeve portion 58 which is formed between adjacent ends of succeeding wrapped units 59 is somewhat reduced in diameter so that when the end of the unit 59 enters the collar 60 it becomes more or less wedged between the threads being knitted into the tube so that the tube grips the unit and continues its feed movement in accordance with the speed at which the tubular jacket is knitted.

If desired, the spacing of the absorbent core sections in the continuous sleeve or jacket may be determined by means of the speed relationship between the core feeding belts 55, 56, and the speed at which the jacket is formed. The slower the speed of the feed belts relative to the speed of travel of the jacket, i. e., the speed at which the jacket is formed, the greater the spacing of the cores.

From the knitting machine, a sausage-like string of incompressed tampon units issues in a downwardly direction. Said string of units is guided around a suitable guide wheel 62 and then upwardly between adjacent reaches of a pair of belts 63 and 64 which serve to carry the jacket enclosed units upwardly to a suitable elevation for delivering the units to mechanism which serves to sever the string of units into independent jacket-covered units such as illustrated in Fig. 4 and to compress the units to the condition of the completed tampon as shown in Fig. 5.

The source of power for driving the mechanism thus far described is, in this instance, an electric motor 65 suitably mounted within the frame work of the apparatus and connected by means of a driving chain 66 to the input shaft 67 of a commercial type of speed changer 68. The output shaft 69 of the speed changer 68 is equipped with a pair of sprockets 70 and 71 of which the sprocket 71 is connected by means of a chain 72 with the input shaft of a speed reducer 73 of conventional construction, the output shaft of which is connected by a chain 74 and suitable sprockets to a shaft 75. The shaft 75 is connected by suitable gearing to a shaft 76 which carries a sprocket engaged by a chain 77 which also engages a sprocket on the shaft 78 of the guide wheel 40 for driving the same. Rotation is transmitted from the shaft 78 to the shaft 79 of the guide wheel 33 by means of a chain 80 which engages suitable sprockets on said shafts 78 and 79, guide sprockets or pulleys 81 and 82 and a sprocket 83 carried by the shaft of the pulley 44 for the belt 42. The chain 80 thus serves to impart rotation from the shaft 78 to guide pulley 33 and to the holding belt 42.

A chain 84 engages sprockets carried by the shafts 79 and 85 to impart rotation to the shaft 85. A shaft 86 is driven from the shaft 85 by suitable, intermeshing gears on these shafts which carry guide wheels or pulleys for guiding the multiple ply strip of tissue material 31. Rotation is similarly imparted by the shaft 86 to the rolls 26 which support the supply roll 25 of tissue backed cotton.

Another chain 88 engages another sprocket on the shaft 85 and a sprocket on the shaft 89 which carries the pulley 14. The pulley 14 is thereby driven to impart travel in the proper direction to the narrow belts 12. The slitters 11 may also be driven by suitable chain or other driving connection with one of the driven shafts of the apparatus but it is preferred that a separate driving motor be provided for rotating the slitter shaft and the slitters at the proper speed.

For driving the cut-off cam 51, a chain 90 engages another sprocket carried by the shaft 76 and a sprocket on the input shaft 91 of a variable speed driving unit 92 of more or less conventional construction. The output shaft 93 of said variable speed drive 92 is connected by means of a chain 94 and suitable sprockets to the cam wheel 51 which rocks the motor driven saw 46 in the manner already described. By suitably adjusting the variable speed drive 92, the timing of the rocking motion of the cutter 46 may be varied to thereby adjust the length of the units cut from the leading end of the wrapped creped tissue paper member.

Suitable provision may be made for facilitating the feed of a new web of material from new or full supply rolls 8 and 25 upon exhaustion of these rolls. As shown in Fig. 1, this means for the supply roll 8 may consist of an arm 95 rotatably mounted intermediate its ends on a frame part and provided at its opposite ends with spindles for receiving the cores of supply rolls 8. As shown in Fig. 1, an almost full sized supply roll 8 has just been started in the machine and the spindle at the lower end of the arm has been emptied and will be ready to receive a full supply roll shortly before the roll 8 is exhausted. It is preferred that the web 10 be delivered to the belts 12 from a plane slightly above the plane of the belts 12 as shown and for this reason the arm 95 is pivoted intermediate its ends so that it may be rocked when the supply roll is nearing exhaustion to permit mounting of a fresh roll in the elevated position indicated in Fig. 1.

For facilitating the introduction of a new web of tissue backed cotton, the apparatus is provided with a pair of angularly disposed arms such as represented at 96 which are adapted to receive the ends of the shaft 29 of the supply roll 25 when this roll is nearing exhaustion, thereby to permit the mounting of a new supply roll in the position in which the roll 25 is illustrated in Fig. 1.

The belts 63 and 64 may be driven in the proper direction and at the same speed by means of a chain drive which interconnects the two conveyors and by means of a drive from the output shaft 69 of the speed controller 68. The latter drive comprises a chain 98 which engages the sprocket 70 on the output shaft 69 of the speed controller 68 and a sprocket on a shaft 99 which is provided with a beveled gear 100 meshing with the beveled gear 101 carried by a suitably journaled shaft on which there is mounted a worm gear 102a. The worm gear 102a meshes with a worm wheel 102b on the shaft 97 which is thereby driven, said shaft being suitably journaled in the frame of the machine.

The knitting machine is driven by suitable connections to the shaft 99. The belt 63 is trained around a pulley on said shaft 97 so as to be thereby driven, and around suitable pulleys on the shafts 104 and 105a. The belt 64 is trained around and guided by pulleys on shafts 106, 107, 108 and 109 which, excepting the pulley on shaft 108, are journalled in normally fixed frame portions. The shaft 108 is carried by the free end of an arm 110 which is pivoted on the shaft 107 for a purpose which will presently be explained.

A chain 103 drivingly interconnects the two conveyors 63 and 64. It is driven by a sprocket on the shaft 97 and travels from the lower side of that sprocket to a sprocket on the shaft 107, then downwardly and around a sprocket on the shaft 109, horizontally to a sprocket on the shaft 109a, then upwardly to a sprocket on the shaft 105b, horizontally to a sprocket on the shaft 104, downwardly and around a sprocket on the shaft 105a and back to the driving sprocket on the shaft 97.

The sprockets and pulleys which govern the speed at which the belts 63 and 64 are driven, should be so related in size that the belts will be driven at the same speed which is preferably such as to provide about 2 per cent over travel when compared with the speed of the belts 55 and 56. This compensates for stretch in the knitted sleeve and aids in holding the threads on the needles of the knitting machine.

The belts 55 and 56 may be interconnected for like travel in opposite directions by means of intermeshing gears, represented at 55a and 56a on the shafts of the uppermost guide pulleys for said belts. A chain 56b engaging suitable sprockets on the shaft 97 and the shaft of the said uppermost guide pulley for the belt 56, may be provided for driving the belts 55 and 56 from said shaft 97.

The delivery of the wrapped severed units 59 to the knitting mechanism is so timed that between the adjacent ends of adjacent units 59, the length of about 5½ inches of the tubular knitted jacket material 58 will be formed. This continuous jacket enclosed series of absorbent body units is fed downwardly from the delivery end of the belt 64 into position between adjacent reaches of a pair of conveyors 111 and 112. The adjacent reaches of said conveyors 111 and 112 are substantially vertically disposed as represented in Fig. 1.

The conveyors 111 and 112 may consist of pairs of chains 113 and 114 (Fig. 3) connected by longitudinally spaced sets of transverse cleats or slats 115. The sets of slats are spaced in accordance with the spacing of the absorbent tampon bodies and the conveyors are driven in such timed relation to the tampon bodies that opposed sets of slats will embrace the successive tampon bodies. The slat formed faces of the conveyors 111 and 112 grip the jacket enclosed absorbent bodies between them so as to positively hold the same and feed the same downwardly.

The conveyors 111 and 112 are intermittently driven by means of a Geneva motion indicated at 116 (Fig. 1). The drive member 117 of said Geneva movement may be driven by a chain 118 which engages suitable sprockets carried by the driven shaft 97 and the shaft of said driving member 117. In the arrangement shown in Fig. 1, the conveyor 111 is connected directly to the shaft of the driven element of the Geneva movement and said conveyor 111 is interconnected with the conveyor 112 by gears represented at 111a and 112a on adjacent shafts of the respective conveyors. Said conveyors being essentially of chain construction are, of course, guided by suitable sprockets carried by appropriately arranged and supported shafts substantially as represented in Fig. 1.

It will be observed that the conveyor belts 63 and 64 deliver the jacket encased string of tampon bodies in a continuous manner whereas the conveyors 111 and 112 act only intermittently to advance said bodies. During the period of movement of the conveyors 111 and 112 the string of tampon bodies is advanced between the conveyors at a somewhat higher rate of travel than they are supplied by the conveyors 63 and 64. This is permitted by the described arrangement which permits the discharge end of the conveyor 64 to intermittently move downwardly in synchronism with the intermittent movement of conveyors 111 and 112. During the period of rest of the conveyors 111 and 112 the arm 110 and the discharge end of the conveyor 64 rocks upwardly so as to maintain the string of tampons taut between the receiving portions of the conveyors 111 and 112 and said discharge end of the conveyor 64.

The arm 110 which is pivoted on the shaft 107 is positively rocked in synchronism with the movement of the conveyors 111 and 112 by means of a crank pin connected with the Geneva movement drive member 117 or with the shaft thereof which acts through a suitable link (not shown) on a rock lever 110a, the other end of which is connected by means of a link 110b to the arm 110. The rock lever 110a and its connections to the Geneva motion member 117 and the arm 110 are so arranged that when the conveyors 111 and 112 are actuated to move the string of tampons downwardly, the arm 110 is also moved downwardly at its outer end. The speed of such downward movement should be equal to the difference between the speed of the conveyors 111, 112, and the speed at which the string of tampons is delivered by the belt 64; this will avoid any stretching of the knitted jacket which carries the tampon bodies. During the rest period of the conveyors 111 and 112 the arm 110 is moved upwardly to its upper starting position substantially as illustrated in Fig. 1.

During a period of rest of the conveyors 111 and 112, the unfilled length 58 of the knitted jacket material is severed intermediate adjacent ends of adjacent absorbent bodies. However, before severing the jacket material suitable adhesive material such as hereinafter described, is applied to the area of the jacket material in which the cutting is effected.

For the purpose of applying the adhesive material, horizontally reciprocable nozzles 119 are provided on opposite sides of the path of travel of the knitted material. Suitable provision is made for delivering adhesive material through said nozzles to the portion of the knitted jacket material located therebetween during a period of rest of the conveyors 111 and 112 and said nozzles may be arranged for rotary movement about their own axes so as to more or less spread the adhesive in an area corresponding to the area of the nozzle ends. As indicated in Fig. 3, the discharge openings 119a in the nozzle ends may be offset from the axis of the nozzle so that spreading of the adhesive will be effectively accomplished incident to the rotation of the nozzles. The purpose of the adhesive material is to prevent unraveling of the knitted jacket material where it is cut as explained below.

The adhesive used should be one which is water resistant, non-toxic, non-irritating, odorless, quick drying, and which forms a very soft, flexible film when dry. One example of such an adhesive consists of a solution of a vinyl resin in acetone and methyl-ethyl-ketone. The resin is plasticized with a high percentage of dibutyl sebacate. It dries in one or two seconds if hot air is directed upon it, and such quick drying is highly desirable in the mechanical handling of the tampon. Other adhesives having the above properties may, of course, be employed. Also the jacket may be made of a synthetic thread, such as cellulose acetate, which can be sealed by means of heat.

While adhesive is being applied between one pair of absorbent body ends, the severing of the jacket will be effected between another pair of adjacent ends substantially as represented in Fig. 3. As there shown a pair of shearing knives 120 and 121, arranged for movement towards and from each other, are adapted to cooperate to shear the jacket material 58 in an area in which adhesive material was previously applied.

The knives 120 and 121 respectively have associated with them members 120a and 121a which have adjacent ends provided with spaced flange-like portions adapted to be interleaved as presented in Fig. 3 when the knives are in overlapped position after completing the cutting of the sleeve material. The flange-like portions of the members 120a and 121a are provided with registering, more or less V-shaped front end notches as represented at 140 (Fig. 7) having rounded bottoms, which coincide with overlying wall portions of openings 141 in the cutting knives 120 and 121 when both the members 120a and 121a and the knives 120 and 121 are closed. The members 120a and 121a are so arranged and operated relative to the cutting knives 120 and 121 that the said flanges will come together just before the knives 120 and 121 cut the sleeve; the interleaved flanges thus serve to support and center the sleeve section which is to be cut.

The holes 141 in the knives 120 and 121 are aligned when the knives are in their closed position, as illustrated in Fig. 3, and a tucking pin 122 passes downwardly through said holes and through the corresponding opening between the bottoms of the notches in the opposed interleaved flanges, thereby to tuck the upwardly projecting sleeve portion of the underlying tampon body into the end of the same. The tucking pin is carried by an arm 122a which extends laterally from the shaft 123 which is vertically reciprocable and horizontally rockable. It may be reciprocated two or three times so as to insure tucking of the sleeve material into the end of the absorbent body of the tampon.

The adhesive applying devices 119 and the sleeve severing and tucking devices move horizontally from outside the path of travel of the adjacent reaches of the conveyors 111 and 112 through the space between the pairs of chains forming each conveyor. The chains are accordingly spaced a distance which would provide the necessary space for permitting inward and outward movement of the adhesive applying devices and the severing and tucking device, the cleats of said conveyors being accordingly made long enough to interconnect the respective pairs of chains.

As shown in Fig. 1, rotary cams 132 and 133 may be provided for effecting horizontal reciprocation of the adhesive applying nozzles and of the shearing knives. Such cams may be driven by means of a chain drive 134 which engages a suitable sprocket carried by the shaft of the Geneva movement drive member 117 and a sprocket on the shaft which carries one of the cams 132. A chain 135 which engages another sprocket on the shaft of the cam 132 may engage a suitable sprocket on the shaft of the cam 133 to drive the latter. The described driving arrangement is substantially duplicated for the cams 132 and 133 on each side of the path of travel of the tampon bodies.

The members 120a and 121a with their flanges may be similarly actuated by means of cams (not shown) driven by connections to the chain 134 or 135 or any shaft thereby driven.

The conveyors 111 and 112 deliver the successive tampon units such as represented at 59—B into the zone of operation of compressing dies which may consist of a lower anvil member 125 (Fig. 3), an opposed or upper member 126, and pairs 127 and 128 of horizontally reciprocable transverse compression members. The anvil member 125 is sutably hollowed out as indicated at 125a to receive the jacket portion 58a which forms the withdrawal cord of the tampon. Air suction through the hollow anvil may be provided for pulling the cord forming portion 58a into the hollow of the anvil.

The tampon unit 59—B is delivered into the socket formed between the inner edges of the pairs of pressure members 127 and 128, the upper pressure member 126 being initially rocked to an offset postion for permitting the tampon unit to move into said socket. Mechanism (not shown) then operates to rotate the shaft 129 carrying the upper pressure member 126 to align the latter with the tampon unit in the socket and to move said shaft and upper pressure member downwardly to compress the tampon unit in the direction of its length. Thereafter the pair 128 of pressure members is actuated to compress the tampon body transversely in one direction after which the other pair 127 of compression members is actuated to compress the body in a direction extending at right angles to the direction of operation of the pressure members 128. The inner or operative edges of the compression members 127 may be of concave form as shown so as to impart a more or less cylindrical form to the compressed tampon body. The lower die member 125 may also be movably mounted so that when the pressure members 127 and 128 are retracted, the lower anvil member 125 may be displaced so as to permit the compressed tampon body to drop out of the die structure and into a suitable receptacle or conveyor for delivering the tampons to other apparatus for subsequent operations such as wrapping and packaging.

The compressing operation which will preferably though not necessarily be effected somewhat more slowly than the other operations may be effected in compression dies carried by a rotary or turret member 130 which is adapted to be advanced step by step by any suitable form of gearing represented at 131 in Fig. 1. In one position of the compression members the longitudinal compression will be effected and in another position horizontal or transverse compression in one direction may be effected while transverse compression in the other direction may be effected in a third position of the turret-carried dies. In such an arrangement the turret member 130 will be equipped with a series of compression die sets which are successively brought into alignment with the discharge ends of the conveyors 111 and 112 so as to successively receive tampon units for compression.

The described apparatus and the method of operation is such that a succession of tampons is formed one by one as a continuous operation beginning with the slitting of the material used in forming the absorbent body, assembling the elements of the absorbent body to build up the desired cross section, wrapping of the body, jacketing and compression thereof. Incidental operations such as applying adhesive to portions of the jacket and severing the jacket to separate the successive units are, of course, also performed at suitable stations so that individual units are handled during the compression operation.

The mechanism is readily adapted for high speed operation. In some instances the speed of operation may be increased by employing two or more knitting machine units and providing an arrangement for distributing the absorbent core bodies cut off by the saw 46 to the various knitting machines. The apparatus which assembles the absorbent core material operates continuously without any interruptions and is thus capable of supplying the absorbent core material at a much higher rate of speed than presently available knitting machines can form the tubular jacket around the absorbent bodies. Each knitting machine would, of course, be associated with its own unit of mechanism for separating the jacketed bodies and compressing them.

Various changes in the construction and arrangement of the described product, apparatus and method of manufacture, may be made without departing from the spirit of the invention.

We claim:

1. The method of making catamenial tampons, which consists in assembling into relatively superposed relation, a plurality of multi-ply webs of absorbent paper so as to form an assemblage having a transverse dimension which is larger than the coresonding dimension of the tampon to be produced, wrapping a pervious sheet around said assemblage to retain said webs in assembled relationship, severing from one end of the assemblage sections thereof of predetermined length, applying a pervious textile jacket around said severed length and then compressing the jacketed length transversely under sufficient pressure to reduce said transverse dimension of the assemblage to the desired tampon size and to consolidate the fibers of the assemblage sufficiently to form a stable tampon.

2. The method of making catamenial tampons, which consists in assembling into relatively superposed relation, a plurality of multi-ply webs of absorbent paper so as to form an assemblage having a transverse dimension which is larger than the corresponding dimension of the tampon to be produced, severing sections of predetermined length from said assemblage, applying to said sections pervious textile jackets of greater length than said sections, tucking an end portion of each jacket into one end of each section, and then compressing the jacketed section transversely with sufficient pressure to reduce its transverse dimension to the desired tampon dimension and to consolidate the fibers of the core so as to cause the core to become normally stable but readily expansible upon being wetted.

3. The method of making catamenial tampons, which consists in assembling into relatively superposed relation, a plurality of multi-ply webs of absorbent paper so as to form an assemblage having a transverse dimension which is larger than the corresponding dimension of the tampon to be produced, severing from said assemblage sections of a length which is greater than the length of the tampons to be produced, applying to said sections, pervious textile jackets of greater length than said sections, tucking an end portion of each jacket into one end of each section, and then compressing the jacketed section both lengthwise and transversely with sufficient pressure to reduce the jacketed section to the desired tampon size and to consolidate the fibers of the core so as to cause the tampon to be normally stable but readily expansible upon being wetted.

4. In apparatus for making tampons, the combination of means for propelling an absorbent rope of fibrous material having a cross sectional size which is larger than the cross sectional size of the tampon to be produced, means for severing end portions from said rope so as to provide tampon core forming sections, means for applying a pervious textile jacket to said sections, and means for compressing said jacketed sections to reduce the transverse dimension thereof to the desired tampon size, and to consolidate the fibers of said core sufficiently to render the tampon normally stable in compressed condition but capable of expansion upon being wetted.

5. Apparatus for making tampons, comprising means for propelling an absorbent rope of fibrous material having a transverse size which is larger than the transverse size of the tampons to be produced, means for applying a wrapper around said rope, means for cutting end portions from said wrapped rope to form tampon core forming sections, means for applying a pervious textile jacket to said sections, and means for compressing said sections to tampon size and operative to consolidate the fibers of the material in said core so as to render the tampon normally stable in compressed condition but capable of expansion upon being wetted.

6. Tampon making apparatus comprising means for propelling an absorbent rope of fibrous material having a cross sectional size which is larger than the cross sectional size of the tampons to be produced, means for wrapping a web of sheet material around said rope as an incident to its travel, means for severing predetermined lengths of said wrapped rope from the forward end portion thereof to form a tampon core, means for propelling the cores successively from said rope and applying to said cores a pervious textile jacket having portions extending beyond the leading and trailing ends of the respective cores, and means for compressing the jacketed cores to reduce the same to the desired tampon size, said compressing means being operative to consolidate the fibers of said cores to such an extent that the compressed tampon will be normally stable in compressed condition but capable of expansion upon being wetted.

7. Tampon making apparatus comprising means for propelling an absorbent rope of fibrous material having a cross sectional size which is larger than the cross sectional size of the tampons to be produced, means for wrapping a web of sheet material around said rope as an incident to its travel, means for severing predetermined lengths of said wrapped rope from the forward end portion thereof to form tampon cores, means for propelling the cores in predetermined endwise spaced relation to each other, means for applying a continuous pervious textile jacket to said spaced cores, means for severing said jacket intermediate adjacent ends of the successive cores so as to thereby provide independent, jacketed cores having jacket portions extending beyond their opposite ends, and means for compressing said jacketed cores to reduce the size of the same to the desired tampon size and to consolidate the fibers of said sections sufficiently to render the tampon normally stable but capable of expansion upon being wetted.

8. Tampon making apparatus comprising means for propelling a rope of absorbent fibrous material having a cross sectional size which is larger than the cross sectional size of the tampons to be produced, means for wrapping a web of sheet material around said rope as an incident to its travel, means for severing predetermined lengths of said wrapped rope from the forward end portion thereof to form tampon cores, means for propelling the cores in predetermined endwise spaced relation to each other, means for applying a continuous pervious textile jacket to said spaced cores, means for severing said jacket intermediate adjacent ends of the successive cores so as to thereby provide independent, jacketed cores having jacket portions extending beyond their opposite ends, means for tucking one of said extending jacket end portions into the end portion of the core within said jacket, and means for compressing said jacketed core to reduce the size thereof to the desired tampon size and so as to compact the fibers of said core sufficiently to render the tampon normally stable but capable of expansion upon being wetted.

9. Tampon making apparatus comprising means for propelling an absorbent rope of fibrous material having a cross sectional size which is larger than the cross sectional size of the tampons to be produced, means for wrapping a web of sheet material around said rope as an incident to its travel, means for severing predetermined lengths of said wrapped rope from the forward end portion thereof to form relatively independent tampon cores, means for propelling the successive cores endwise in predetermined endwise spaced relationship to each other, means for applying a continuous jacket of pervious textile material to said spaced cores, means for applying adhesive material to portions of said jacket intermediate adjacent ends of adjacent cores, means for severing said jacket in the zones thereof to which adhesive is applied so as to form relatively independent jacketed tampon units, and means for compressing said units to reduce the same to the desired tampon size and so as to compact the fibers of the cores to render the tampon normally stable but capable of expansion upon being wetted.

10. Tampon making apparatus comprising means for propelling an absorbent rope of fibrous material having a cross sectional size which is larger than the cross sectional size of the tampon to be produced, means for wrapping a web of sheet material around said rope as an incident to its travel, means for severing predetermined lengths of said wrapped rope from the forward end portion thereof to form relatively independent tampon cores, means for propelling the successive cores endwise in predetermined endwise spaced relationship to each other, means for applying a continuous jacket of pervious textile material to said spaced cores, means for applying adhesive material to portions of said jacket intermediate adjacent ends of adjacent cores, means for severing said jacket in the zones thereof to which adhesive is applied so as to form relatively independent jacketed tampon units, means for tucking the jacket material at one end of each of the jacketed units into the respectively enclosed cores, and means for compressing said units to reduce the same to the desired tampon size and so as to compact the fibers of said cores to render the tampon normally stable but capable of expansion upon being wetted.

11. Tampon manufacturing apparatus, comprising means for continuously propelling a rope of absorbent fibrous material, means for successively severing sections of predetermined length from the leading end of said rope, means for continuously propelling said severed sections in endwise spaced relation to each other and applying thereto a continuous pervious material jacket, means for receiving said continuously jacketed sections and intermittently propelling the same, means operative during periods of rest of said continuously jacketed sections for severing the jacket intermediate adjacent ends of adjacent absorbent sections to thereby provide relatively independent tampon forming units having jacket portions extending beyond the opposite ends of the respectively enclosed rope sections, and means for receiving said jacketed sections and compressing the same to predetermined tampon size and to consolidate the fibers of said jacketed rope sections sufficiently to render the tampons normally stable but capable of expansion upon being wetted.

12. Tampon manufacturing apparatus, comprising means for continuously propelling a rope of absorbent fibrous material, means for successively severing sections of predetermined length from the leading end of said rope, means for continuously propelling said severed sections in endwise spaced relation to each other and applying thereto a continuous pervious material jacket, means for receiving said continuously jacketed sections and intermittently propelling the same, means operative during periods of rest of said continuously jacketed sections for severing the jacket intermediate adjacent ends of adjacent absorbent sections to thereby provide relatively independent tampon forming units having jacket portions extending beyond the opposite ends of the respectively enclosed rope sections, and a series of intermittently propelled devices for successively receiving the tampon units and compressing and compacting the same to reduce said units to predetermined tampon size, and to consolidate the fibers of said jacketed rope sections sufficiently to render the tampon normally stable but capable of expansion upon being wetted.

13. In apparatus for making tampons, the combination of means for propelling an absorbent web of fibrous material in an endwise direction, means for severing end portions from said web so as to provide tampon cores having at least one cross sectional dimension which is larger than the corresponding cross sectional dimension of the tampon to be produced, means for applying pervious textile jackets to said cores, and means for compressing said jacketed cores transversely to reduce said larger cross sectional dimension to substantially the desired transverse dimension of the tampon to be produced, and to consolidate the fibers of said core sufficiently to render the tampon normally stable in compressed condition but capable of expansion upon being wetted.

14. The method of making catamenial tampons which comprises the steps of propelling a plurality of fibrous material tampon cores successively in spaced relation to each other along a predetermined path of travel, applying a continuous, pervious, textile jacket successively around the cores so as to form a chain of jacket connected, spaced cores, severing said jacket intermediate the ends of successive cores, thereby to form separated jacketed tampon cores each having jackets which extend beyond at least one of the ends of each of said cores, tucking such jacket end portions into the adjacent end portions of the respective cores, and compressing the jacketed cores to consolidate the fibers thereof sufficiently to form said jacketed cores into compressed tampons which are normally stable in compressed condition but readily expansible upon being wetted.

15. The method of making catamenial tampons which comprises the steps of propelling a plurality of fibrous material tampon cores successively in spaced relation to each other along a predetermined path of travel, applying a continuous pervious textile jacket successively around the cores so as to form a chain of jacket connected spaced cores, severing said jacket intermediate the ends of successive cores at a point nearer to one of said cores than to the other, thereby forming separated jacketed cores having jackets which extend different distances beyond the opposite ends of the cores, tucking the shorter of the extending jacket end portions into the adjacent end portions of the respective cores, and compacting the jacketed cores to consolidate the fibers thereof and to form said jacketed cores into compressed tampons which are normally stable but readily expansible upon being wetted.

16. The method of making catamenial tampons which comprises the steps of propelling a plurality of fibrous material tampon cores successively in spaced relation to each other along a predetermined path of travel, applying a continuous pervious textile jacket successively around the cores so as to form a chain of jacket connected, spaced cores, applying adhesive to portions of the jacket material intermediate adjacent cores to bond the threads of said jacket against relative movement in the portions to which the adhesive is applied, severing said jacket intermediate adjacent cores in the zones in which the jacket threads are bonded as aforesaid, thereby forming separated jacketed cores having jacket end portions which extend beyond the opposite ends of the cores and in which the jacket threads at the free ends of said jacket end portions are adhesively bonded against relative movement as aforesaid, tucking one of said extending jacket end portions of each jacketed core into the adjacent core end portion, and compressing the jacketed cores to consolidate the fibers thereof sufficiently to form said jacketed cores into compressed tampons which are normally stable in compressed condition but readily expansible upon being wetted.

17. The method of making catamenial tampons which comprises the steps of propelling a strip of tampon core material endwise, successively severing tampon core sections from an end of said strip, successively advancing said sections in spaced relation to each other, applying a continuous jacket of textile material around the successively advanced sections so as to thereby form a chain of jacket connected spaced core sections, severing said jacket intermediate successive sections so as to form separated jacketed core sections, and compacting the separated jacketed sections to consolidate the fibers of said core sections and form said jacketed cores into compressed tampons which are normally stable but readily expansible upon being wetted.

18. The method of making catamenial tampons which comprises the steps of propelling a strip of tampon core material endwise, successively severing tampon core sections from an end of said strip, successively advancing said sections in spaced relation to each other, applying a continuous jacket of textile material around the successively advanced sections so as to thereby form a chain of jacket connected, spaced core sections, severing said jacket intermediate successive sections so as to form separated jacketed core sections having jackets thereon which extend beyond at least one of the ends of the respective enclosed sections, tucking such extending jacket portions into the adjacent end portions of the respective core sections, and then compressing the jacketed sections to consolidate the fibers of the sections sufficiently to form compressed tampons which are normally stable in compressed condition but readily expansible upon being wetted.

19. The method of making catamenial tampons which comprises the steps of propelling a strip of tampon core material endwise, successively severing tampon core sections from an end of said strip, successively advancing said sections in spaced relation to each other, applying a continuous jacket of textile material around the successively advanced sections so as to thereby form a chain of jacket connected spaced core sections, applying adhesive to portions of the jacket material intermediate adjacent core sections to bond the threads of the jacket together, severing said jacket in the zones in which the threads are bonded together as aforesaid, and then compacting the separated jacketed sections to consolidate the fibers thereof and form the same into compressed tampons which are normally stable but readily expansible upon being wetted.

20. Tampon making apparatus comprising means for propelling a plurality of fibrous material tampon cores successively in spaced relation to each other along a predetermined path of travel, means for applying a continuous, pervious textile jacket to said spaced cores, means for severing said jacket intermediate adjacent ends of the successive cores so as to thereby provide separated jacketed cores having at least one jacket end portion extending beyond an end of each core, means for tucking said extending jacket end portions into the adjacent end portions of the respective cores within said jackets, and means for compressing said jacketed cores to compact the fibers thereof sufficiently to make tampons which are normally stable in compressed condition but capable of expansion upon being wetted.

21. Tampon making apparatus comprising means for propelling a plurality of fibrous material tampon cores successively in spaced relation to each other along a predetermined path of travel, means for applying a continuous jacket of pervious textile material to said spaced cores, means for applying adhesive material to portions of said jacket intermediate adjacent ends of adjacent cores, means for severing said jacket in the zones thereof to which adhesive is applied so as to form relatively independent jacketed tampon cores, and means for compressing said jacketed cores to compact the fibers thereof sufficiently to make tampons which are normally stable in compressed condition but capable of expansion upon being wetted.

22. Tampon making apparatus comprising means for propelling a plurality of fibrous material cores successively in spaced relation to each other along a predetermined path of travel, means for applying a continuous jacket of pervious textile material to said spaced cores, means for applying adhesive material to portions of said jacket intermediate adjacent ends of adjacent cores, means for severing said jacket in the zones thereof to which adhesive is applied so as to form relatively independent jacketed tampon cores having at least one jacket end portion extending beyond an end of each core, means for tucking an extending jacket end portion of each jacketed core into the adjacent core end portion, and means for compressing said jacketed cores to compact the fibers of said cores sufficiently to make tampons which are normally stable in compressed condition but capable of expansion upon being wetted.

CHARLES J. GREINER.
OSCAR T. THOMPSON.

REFERENCES CITED

The following references are of record in the file of this patent:

UNITED STATES PATENTS

| Number | Name | Date |
|---|---|---|
| 1,773,956 | Crane | Aug. 26, 1930 |
| 1,825,492 | Wandel | Sept. 29, 1931 |
| 2,178,704 | Robinson | Nov. 7, 1939 |
| 2,336,744 | Manning | Dec. 14, 1943 |
| 2,464,310 | Harwood | Mar. 15, 1949 |

FOREIGN PATENTS

| Number | Country | Date |
|---|---|---|
| 466,048 | Germany | Sept. 27, 1928 |
| 594,761 | Germany | Mar. 14, 1934 |
| 537,113 | Great Britain | June 10, 1941 |
| 800,448 | France | July 4, 1936 |